US012709460B2

(12) United States Patent
Graydon et al.

(10) Patent No.: US 12,709,460 B2
(45) Date of Patent: Aug. 18, 2026

(54) SELF-LOCKING FOLDING HOPPER AND A LOCKING METHOD THEREOF

(71) Applicant: SANDVIK LTD, Dungannon (GB)

(72) Inventors: Stuart Graydon, Dungannon (GB); Stuart Smyth, Dungannon (GB)

(73) Assignee: Sandvik Ltd, Dungannon (GB)

( * ) Notice: Subject to any disclaimer, the term of this patent is extended or adjusted under 35 U.S.C. 154(b) by 154 days.

(21) Appl. No.: 18/559,639

(22) PCT Filed: Apr. 26, 2022

(86) PCT No.: PCT/EP2022/061002
§ 371 (c)(1),
(2) Date: Nov. 8, 2023

(87) PCT Pub. No.: WO2022/238106
PCT Pub. Date: Nov. 17, 2022

(65) Prior Publication Data

US 2024/0239597 A1 Jul. 18, 2024

(30) Foreign Application Priority Data

May 11, 2021 (EP) .................................... 21173175

(51) Int. Cl.
*B65D 88/30* (2006.01)
*B02C 21/02* (2006.01)
(Continued)

(52) U.S. Cl.
CPC ........... *B65D 88/30* (2013.01); *B65D 88/524* (2013.01); *B65D 90/04* (2013.01); *B65G 11/166* (2013.01);
(Continued)

(58) Field of Classification Search
CPC ...... B65D 88/30; B65D 88/524; B65D 90/04; B65G 11/166; B65G 47/18; B65G 41/008;
(Continued)

(56) References Cited

U.S. PATENT DOCUMENTS

2004/0035963 A1 2/2004 Nuora
2005/0263626 A1* 12/2005 Brock .................. B65G 41/008 241/30

(Continued)

FOREIGN PATENT DOCUMENTS

CN 204769068 U 11/2015
DE 102016119797 B3 3/2018

(Continued)

*Primary Examiner* — Gene O Crawford
*Assistant Examiner* — Abby A Jorgensen
(74) *Attorney, Agent, or Firm* — Corinne R. Gorski

(57) ABSTRACT

A folding feeder hopper includes a locking assembly and side walls, which are configured to lock themselves when unfolded or deployed for operation. The locking assembly has a first locking device provided on the side wall and configured to engage with a second locking device provided on a support assembly. The second locking device includes an elastic element and retaining members on front and rear ends of the hopper for providing alignment to the side walls when they move between locked and unlocked positions. A method for locking the side walls in a deployed position is also provided.

16 Claims, 7 Drawing Sheets

(51) Int. Cl.

| | |
|---|---|
| ***B02C 23/02*** | (2006.01) |
| ***B07B 1/00*** | (2006.01) |
| ***B07B 13/16*** | (2006.01) |
| ***B65D 88/52*** | (2006.01) |
| ***B65D 90/04*** | (2006.01) |
| ***B65G 11/16*** | (2006.01) |
| ***B65G 47/18*** | (2006.01) |

(52) U.S. Cl.
CPC ............ *B65G 47/18* (2013.01); *B02C 21/026* (2013.01); *B02C 23/02* (2013.01); *B07B 1/005* (2013.01); *B07B 13/16* (2013.01)

(58) Field of Classification Search
CPC ....... B02C 21/026; B02C 23/02; B02C 21/02; B07B 1/005; B07B 13/16
See application file for complete search history.

(56) References Cited

U.S. PATENT DOCUMENTS

| | | | | |
|---|---|---|---|---|
| 2006/0016104 | A1* | 1/2006 | Viitasalo | B02C 23/02 37/307 |
| 2009/0263194 | A1* | 10/2009 | Viitasalo | B02C 23/02 404/110 |
| 2021/0001349 | A1* | 1/2021 | Köpf | B65D 88/30 |
| 2021/0032041 | A1* | 2/2021 | Geywitz | B02C 23/02 |

FOREIGN PATENT DOCUMENTS

| | | | | |
|---|---|---|---|---|
| EP | 2664492 | A2 | 11/2013 | |
| EP | 2949397 | A1 | 12/2015 | |
| GB | 2496522 | A | 5/2013 | |
| WO | WO-2013068589 | A1 * | 5/2013 | B65G 41/008 |
| WO | WO-2015180915 | A1 * | 12/2015 | B02C 21/026 |
| WO | WO-2018073068 | A1 * | 4/2018 | B02C 23/02 |

* cited by examiner

SELF-LOCKING FOLDING HOPPER AND A LOCKING METHOD THEREOF

RELATED APPLICATION DATA

This application is a § 371 National Stage Application of PCT International Application No. PCT/EP2022/061002 filed Apr. 26, 2022 with priority to EP 21173175.7 filed May 11, 2021.

TECHNICAL FIELD

The present disclosure relates to a folding hopper for a bulk material processing apparatus and in particular, although not exclusively, to a folding hopper in which side walls are capable of being moved between a lowered transport position and a raised working position, and also capable of locking themselves in the raised working position using a self-locking mechanism. The disclosure further relates to a method of locking the side walls of the hopper in the raised working position.

BACKGROUND ART

Bulk material processing plants or apparatuses can be static or transportable between operational sites. Examples of such material processing plants or apparatuses include screeners, crushers and combined crushing and screening apparatus. These apparatuses typically include a loading hopper which receives a supply of bulk material that is then fed to a material processing unit like screen box or crusher for subsequent discharge via one or number of intermediate or discharge conveyors.

The supply from the hopper to the material processing unit relies on gravity discharge, and the unit is generally positioned lower than the hopper, which being the uppermost component, determines the maximum height of the processing plant. Accordingly, it is known to configure the hopper with walls that are capable of folding or collapsing downwardly to appreciably reduce the overall height of the apparatus and allow convenient transport along public highways without risk of impact with overhead obstructions like bridges. Examples of such foldable hoppers are described in US 2004/0035963; US 2006/0016104; EP2949397; EP 2664492 and GB 2496522. Alternatively, the hopper could be positioned lower than the processing unit and there could be a belt conveyor to raise the material up into the processing unit from the hopper.

However, conventional adjustable mounted hoppers are disadvantageous for a number of reasons. In particular, service personnel are often required to physically climb the plant to manually manipulate locking components at the hopper walls. Commonly known as high level pinning, such operations may prove to be hazardous for the personnel. Typically, this is achieved by manually inserting a wedge or a pin into a suitable crevice or an aligned pair of apertures, to immobilize the raised side walls. In conditions prevalent in mining and construction areas, working high up with heavy wedges as well as working between the frame of the apparatus and the heavy wall of the hopper that is attached by means of hinges to the frame, is a safety risk.

Further, the walls must also be secured reliable to withstand the significant loading forces that are imparted to them as the hopper is supplied with bulk material. As a result of impacts of the material on the walls, not only the hopper, but the frame structure as well as auxiliary components of the apparatus may become fatigued and rupture as time goes on.

Document EP2949397 describes a locking mechanism which does not require any manual intervention. However, this arrangement requires the use of an additional component, which is an external support arm to hold the side walls, when they are locked in raised working position.

Accordingly, there exists a need for a folding hopper arrangement, which addresses the above-mentioned drawbacks. In particular, a folding hopper arrangement is desired which does not require any high-level pinning or lifting equipment used by service personnel, to lock the side walls in raised working position. Further, such an arrangement is desired to not require any additional external supports for the side walls locked in raised working positions.

SUMMARY

The aim of the present disclosure is to overcome or at least reduce the above-mentioned problems that exist in the prior-art.

It is an objective of the present disclosure to provide a folding hopper for a bulk material processing apparatus, that provides an automated or semi-automated movement of the hopper side walls between a lowered transport position and a raised working position.

It is a further objective of the present disclosure to provide a folding hopper for a bulk material processing apparatus that is quick and easy to set up and does not compromise on the safety of the operating personnel.

It is another objective of the present disclosure to provide a folding feeder hopper for a bulk material processing apparatus that is capable of being controlled remotely.

It is yet another objective of the present disclosure to provide a folding hopper for a bulk material processing apparatus that is compact, stable and does not require external support structures for the side walls when they are locked in raised working position.

The above objectives are achieved by the present disclosure as it provides a folding feeder hopper in which the side walls of the hopper are configured to be moved between a lowered and a raised position and are capable of locking themselves in the raised position without the need for personnel to manually engage any locking components. Other objects and advantages of the present disclosure will be more apparent from the following description, which is not intended to limit the scope of the present disclosure.

According to a first aspect of the present disclosure there is provided a folding feeder hopper for a bulk material processing apparatus comprising, at least one side wall pivotably mounted to a support frame which has a front end and a rear end, wherein the front end is proximal to the material processing unit and the rear end is away from the material processing unit on the apparatus, the side wall being mounted on the support frame via at least one pivot mount; a rear wall mounted to the support frame at the rear end; at least one support assembly of the side wall, mounted on the support frame and comprising a first bracket housing a slide actuator, and a second bracket housing a rotation actuator; and a locking assembly comprising a first locking means, provided at the lower surface of the side wall and a second locking means mounted at the support assembly characterized in that the first locking means is configured to engage with the second locking means, and wherein the second locking means comprises a material which has a higher degree of elasticity than the material of the first locking means.

Preferably, the first locking means is configured to engage with the second locking means enabling the side wall to be fixed in the unlocked working position (C) when the slide actuator causes the side wall to move from the unlocked working position (C) to a locked working position (D), the engagement thereby enabling the side wall to be locked in the locked working position (D).

Advantageously, in the present arrangement, the locking is achieved when the first locking means engages with the second locking means and applies pressure received from the slide actuator to the second locking means. Owing to its higher elasticity of one of the components, the second locking means on being compressed, provides a contrasting force in the opposite direction. When there occurs a balance of these two contrasting forces from the first and the second locking means, there occurs immobilization of the side wall in the raised working position, thereby making it a self-locking arrangement for holding the side wall in the raised position. The high elasticity of one of the components of the second locking means also enables shock attenuation from the vibrations of the material load, when the material processing apparatus is in operation, thereby preventing the hopper from mechanical damage.

It is an advantage of the present disclosure that the side walls of the feeder hopper can be installed and locked from the lowered transport position to the raised working position and back from a safe place that is located away from the apparatus, thereby preventing the operating personnel from risk of injuries.

Preferably, the first locking means is in the form of a wedge provided on the lower surface of the side wall. The wedge may form a part of the bracket mounted on the lower surface of the side wall, or may be in the form of a protrusion on the lower surface of the side wall.

Preferably, the wedge is a part of the side wall or integrated with the side wall. This provides ease of manufacturing of the side wall, and also does not require additional installation of the wedge on the side wall by an operating personnel.

The wedge shape is advantageous to the present disclosure, as it facilitates cooperation or mechanical engagement with the second locking means.

Preferably, the second locking means is mounted at the support frame and at least one of its components is made from a damping material or an elastic material for attenuation of shock loads. The second locking means prevents the rotation of the side wall during machine operation (when loaded with material) by restricting the movement of the first locking means, therefore restricting the outward rotation of the side wall. Optionally, the second locking means comprises an elastic member positioned between a front metal plate which faces the first locking means and comes into direct contact with the first locking means when the side walls are raised and locked, and a rear metal plate which is in direct contact with the frame of the support assembly. The advantage of having an elastic member sandwiched between two metal plates, is that in addition to shock attenuation as explained above, the elastic member provides the back pressure to counter the pressure of the slide actuator propelled first locking means, enabling self-locking of the side walls when it is in raised working position.

Preferably, the support assembly further comprises of a first guiding groove configured to receive a first pivot pin, and a second guiding groove configured to receive a second pivot pin, the first guiding groove being parallel to the second guiding groove, wherein the first and the second pivot pins are configured to move synchronously in response to the translational actuation from the slide actuator. For the purpose of this disclosure, the term "translational" means linear motion happening in a horizontal plane. The first pivot pin moving in the first guiding groove and the second pivot pin moving parallelly in the second guiding groove cause the side wall to move in a translational motion i.e. linearly in a horizontal plate. The advantage of this structural feature of parallel grooves is that they allow smooth translational motion of side walls between the unlocked and locked positions.

Preferably, the slide actuator provided in the folding feeder hopper is configured to provide translational movement to the side wall between a locked transport position (A) and an unlocked transport position (B) and the rotation actuator is configured to provide pivoting of the side wall between an unlocked transport position (B) and an unlocked working position (C).

Preferably, the slide actuator is configured to have a first and a second translational movement, wherein the first translational movement enables the side wall to move from a locked transport position (A) to an unlocked transport position (B), and wherein the second translational movement propels the first locking means towards the second locking means enabling the side wall to move from the unlocked working position (C) to a locked working position (D) in such a way that the side walls get raised and immobilized at the locked working position (D).

Further, the rotational actuator provided in the folding feeder hopper is configured to provide a rotational movement to the side wall, in such a way that the rotational movement occurs after the first translational movement and before the second translational movement, enabling the side wall to move from the unlocked transport position (B) to an unlocked working position (C).

The slide actuator and the rotation actuator may comprise a hydraulic, pneumatic or electric actuator.

Preferably, the support assembly further comprises of a first liner assembly mounted on the upper surface of the support assembly. The first liner assembly provides a sliding contact surface for the first locking means when, on being propelled by the slide actuator, it moves in the second translational motion, towards the second locking means and mechanically engages with it. Further, the first locking means is provided with a second liner assembly mounted on the lower surface of the first locking means. The second liner assembly is configured to slide over the first liner assembly during the second translational motion.

Thus, the first liner assembly is configured to make a sliding contact with the second liner assembly when the slide actuator causes the side wall to move translationally between the unlocked working position (C) and the locked working position (D). The liner assemblies make the first contact at the end of the first rotational movement from unlocked transport position (B) to unlocked working position (C).

Advantageously, both first and second liner assemblies are facing each other, providing complimentary sliding surfaces to enable smooth sliding of the first locking means over the upper surface of the support assembly, thereby enabling unhindered translational motion of the side wall between unlocked working (C) and locked working positions (D).

Preferably, the friction coefficient of the material of the first and the second liner assemblies is lower than the friction coefficient of the side wall. The advantage of having a low friction coefficient is that it facilitates smooth sliding motion of the first locking means over the upper surface of the support assembly, which enables the first locking means to engage with the second locking means following the second translational motion.

Preferably, the line of action of the sliding contact between the first liner assembly and the second liner assembly is parallel to a line of action of the slide actuator when it provides translational movement to the side wall between the unlocked working position (C) and the locked working position (D). Advantageously, the parallel lines of action enable the working of the locking mechanism. The term 'line of action', for the purpose of the instant application, refers to the geometric representation of the direction of the force vector. Hence, the friction force generated between first liner assembly and second liner assembly is in a direction parallel to the pressure exerted by the slide actuator (also known as priming pressure) for pushing the first locking means towards the second locking means.

Preferably, the locking assembly further comprises at least one retaining member mounted on the front end of the support frame and at least one retaining member mounted on the rear wall. Optionally, one of the retaining member may be mounted on the rear end of the support frame. The retaining members are an important part of the self-locking mechanism. They serve as guides for the side wall, thereby offering alignment to the side wall, especially in its locked state. Advantageously, the retaining members make the whole apparatus compact, especially when the side walls are folded for transporting.

Further, preferably, an engagement plane of the retaining members is parallel to the first and the second guiding grooves. Parallel engagement planes are favorable since they ensure correct alignment during locking and unlocking of the side walls. The term 'engagement plane' for the purpose of the instant application refers to plane(s) that lie in a direction parallel to the line of action of the slide actuator.

Advantageously, the side wall is provided with a pivot which is positioned axially above the first locking means when the side wall is in unfolded state, especially when the side wall in in locked working position (D). When the apparatus is in operation, the material load entering the hopper, pushes the side walls axially outwards. Since the bottom of the hopper is narrower than the top, the pressure from the load gets concentrated on the lower part of the unfolded side walls. The pivot being positioned at a substantial height in the support assembly, causes the material load to exert pressure on the part of the side wall which is below the pivot, thereby causing the side wall to continue to remain in locked working position (D). Thus, the position of the pivot in this aspect of the disclosure is favorable for the functioning of the folding feeder hopper.

The higher position of the pivot is also favorable as it ensures physical contact between first liner assembly and the second liner assembly when the side walls move between opened and unopened states.

Optionally, the rear wall is a part of the support frame. This alternate embodiment provides ease of manufacturing and reduced number of steps in the assembly of the hopper.

Optionally, the support assembly is integrated with the support frame, i.e. the support assembly forms a part of the support frame. This alternative embodiment provides ease of manufacturing and installation, and reduced number of steps in the assembly of the hopper.

According to the second aspect of the present disclosure, there is provided a mobile bulk material processing apparatus comprising, a support frame; a processing unit supported at the support frame; tracks or wheels to allow the apparatus to move over the ground; a discharge conveyor; a primary motor output and a folding hopper with a locking mechanism for the side walls, as described above, to contain material to be fed to the processing unit.

Advantageously, the self-locking side walls for the feeder hopper, provide better stability and compact geometry to the mobile bulk material processing apparatus. The locking assembly used in the feeder hopper, is quick and easy to install, and does not require any external support structure.

According to the third aspect of the present disclosure, there is provided a method for locking at least one side wall of the feeder hopper of a bulk material processing apparatus, comprising the following steps:

first translational movement by a slide actuator enabling the side wall to move from a locked transport position (A) to an unlocked transport position (B);

a rotational movement by a rotation actuator enabling the side wall to move from the unlocked transport position (B) to an unlocked working position (C);

second translational movement by the slide actuator enabling the side wall to move from the unlocked working position (C) to a locked working position (D), wherein a locking assembly is configured to lock the side wall in the locked working position (D); wherein the locking assembly comprises a first locking means provided at the lower portion of the side wall and a second locking means mounted at the support assembly;

characterized in that the first locking means mechanically engages with the second locking means when the slide actuator moves the side wall from the unlocked working position (C) to the locked working position (D) enabling the side wall to be locked in the locked working position (D).

Preferably, the method of locking the side walls of the feeder hopper is capable of being controlled remotely, and requires little or no manual intervention.

Preferably, the method of locking the side walls of the feeder hopper is automated or semi-automated. In the automated method, the pressure in the hydraulic cylinder of the slide actuator can be monitored with the use of pressure sensors. The level can be continuously received at a PLC device which may or may not be a part of the mobile bulk processing apparatus. The feedback provided from the pressure sensors or visual feedback from the side walls, shall decide the consequent adjustment required for the locking assembly.

Advantageously, the method of locking the side walls of the feed hopper allows the operation of the apparatus to continue in safe and reliable manner, with minimum manual intervention.

Other aspects and advantages of the present disclosure will be more apparent from the following description, which is not intended to limit the scope of the present disclosure.

BRIEF DESCRIPTION OF DRAWINGS

A specific implementation of the present invention will now be described, by way of example only, and with reference to the accompanying drawings in which.

DETAILED DESCRIPTION OF PREFERRED EMBODIMENT OF THE INVENTION

Embodiments of the present disclosure will now be described with reference to the accompanying drawing. Embodiments are provided so as to thoroughly and fully convey the scope of the present disclosure to the person skilled in the art. It will be apparent to the person skilled in the art that the details provided in the embodiments should not be construed to limit the scope of the present disclosure.

Figure 1:
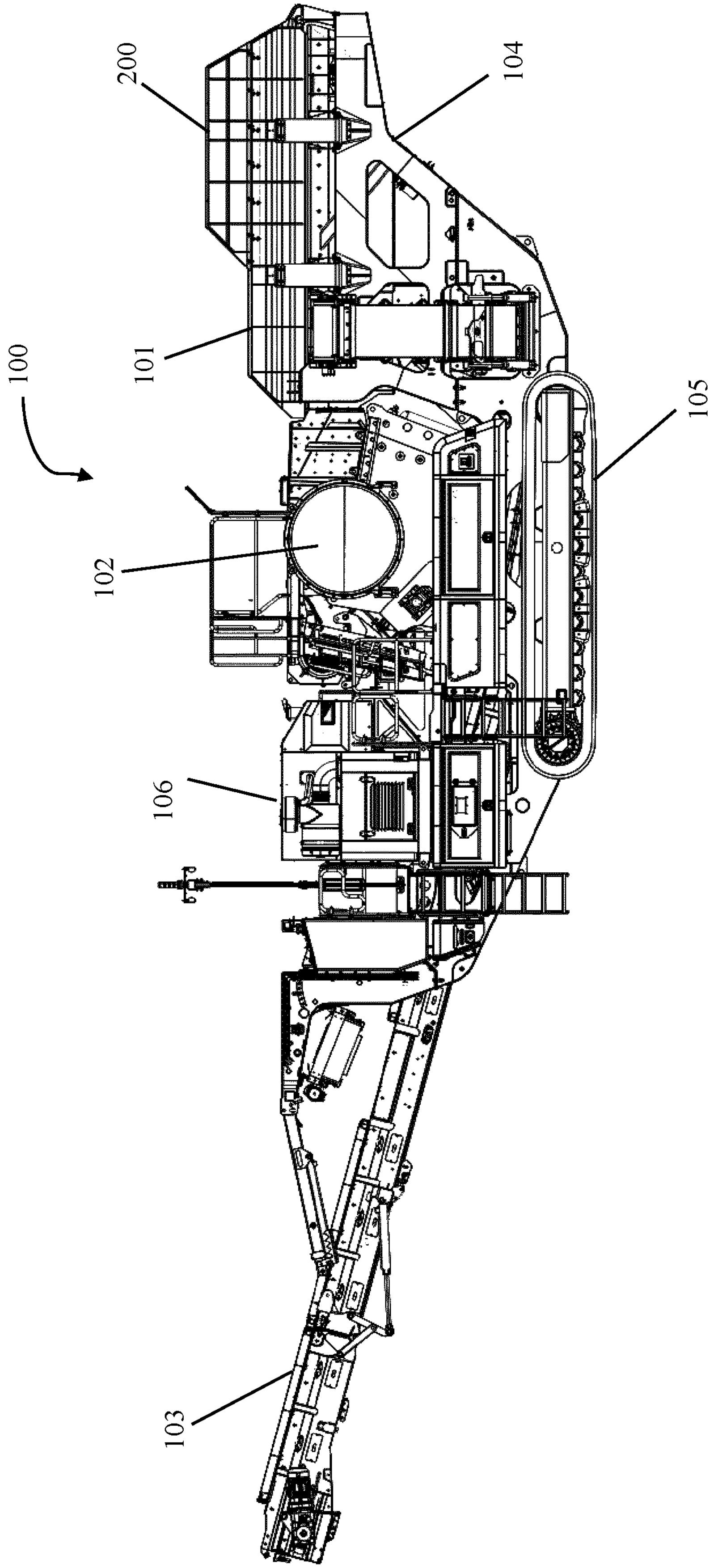
FIG. 1 is an external side elevation view of a mobile bulk material processing apparatus embodying one aspect of the present disclosure.

Referring to FIG. 1, a mobile bulk material processing apparatus 100 comprises a support frame 104 that supports an undercarriage to mount a pair of endless tracks 105 to enable apparatus 100 to be self-propelled over the ground. Apparatus 100 further comprises a primary motor 106, an input feed hopper 101, a material processing unit like a crusher 102 and a discharge conveyor 103. Feed hopper 101 comprises folding hopper side walls 200 which are movable between a raised working position when they are unfolded and a lowered transport position when they are folded. More specifically, the side walls 200 are configured to move between four positions A, B, C and D, as described in FIGS. 5A-5D, wherein A is locked transport position, B is unlocked transport position, C is unlocked working position and D is locked working position.

Figure 2A:
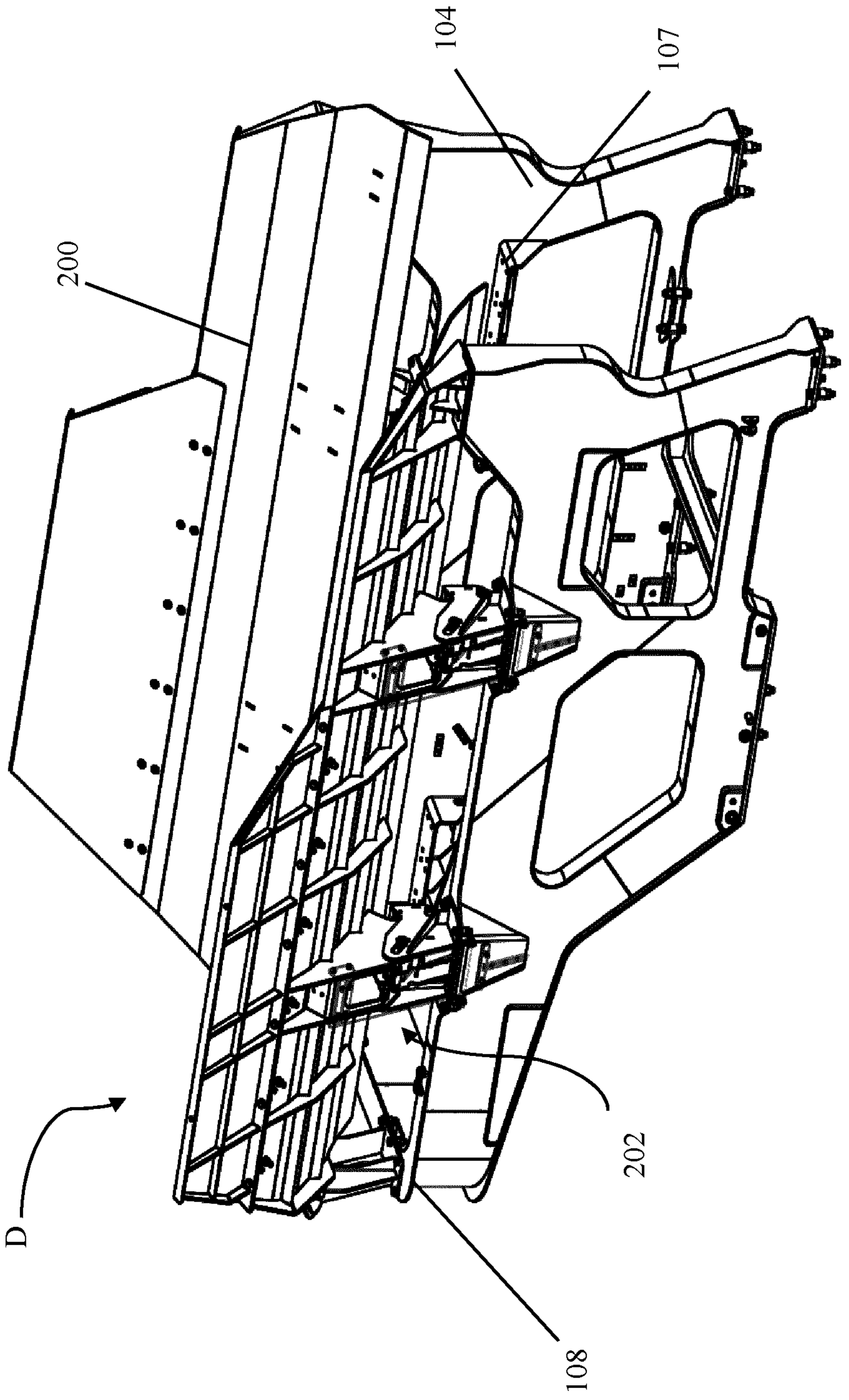
FIG. 2*a* is a perspective view of the feeder hopper of the apparatus of FIG. 1 showing the side walls unfolded for operation and FIG. 2*b* is a perspective view of the feeder hopper showing the side walls in folded state for transport, according to one of the aspects of the present disclosure.
Figure 2B:
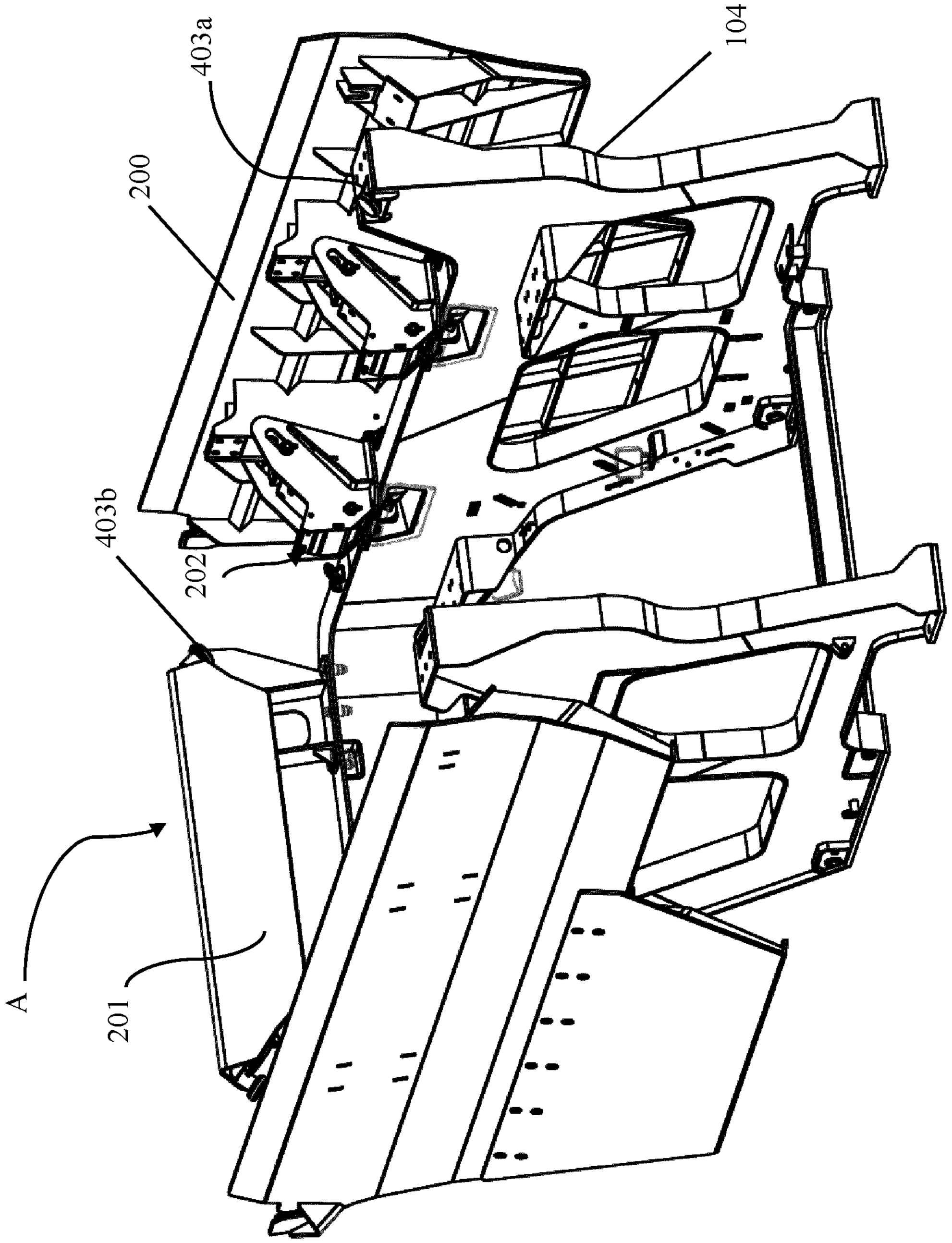

FIG. 2A and FIG. 2B illustrate the unfolded and folded states of the side walls 200 respectively. Referring to FIG. 2A, feeder hopper 101 comprises of a pair of side walls 200 aligned generally with a longitudinal axis of the mainframe 104. The side walls 200 are shown to be unfolded in locked working position D which is the preferred position when the material processing apparatus 100 is in operation. The feeder hopper 101 is mounted on the support frame 104 which has a front end 107 and a rear end 108, wherein the front end 107 is proximal to the material processing unit 102 and the rear end is distant or away from the material processing unit 102. Support assembly 202 is mounted on the support frame 104, at least one on each side of the frame 104, and coupled with the side walls 200. According to a preferred embodiment, two or more support assemblies 202 are provided for each side wall 200 of the hopper 101. In addition to providing support to the unfolded side walls 200, the support assembly 202 houses the slide actuator (205) and rotation actuator (206) (not shown in this figure) which cause the side walls 200 to move between the locked transport position A and the locked working position D.

Referring to FIG. 2B, the feeder hopper 101 is shown with the side walls 200 in folded state in the locked transport position A which is the preferred position for the side walls 200 when the material processing apparatus 100 is not in operation or being transported to the site of operation. A rear wall 201 is mounted on the rear end 108 of the support frame 104. According to an alternate embodiment, the rear wall 201 may be integrated with the support frame 104 i.e. rear wall 201 may be part of the support frame 104. Support assembly 202 is mounted on the support frame 104, and coupled to the side wall 200. One retaining member 403*a* is mounted on the front end 107 of the support frame 104 and one retaining member 403*b* is mounted on the rear wall 201. The retaining members 403*a* and 403*b* form an important part of the self-locking mechanism of the side walls 200. These retaining members 403*a* and 403*b* offer alignment to the side wall 200 and serve as guide for the side wall 200 especially when the side wall 200 is in locked working position D. When the side wall 200 unfolds and undergoes the second translational motion to move from unlocked working position C to locked working position D, the retaining members 403*a* and 403*b* engage with the respective ends of the side wall 200 enabling the locking mechanism to conclude. Thus, at the end of the second translational motion, the side wall 200 gets immobilized in the position D.

According to an alternate embodiment, the retaining member 403*b* may also be mounted on the rear end 108 of the support frame 104.

Figure 3:
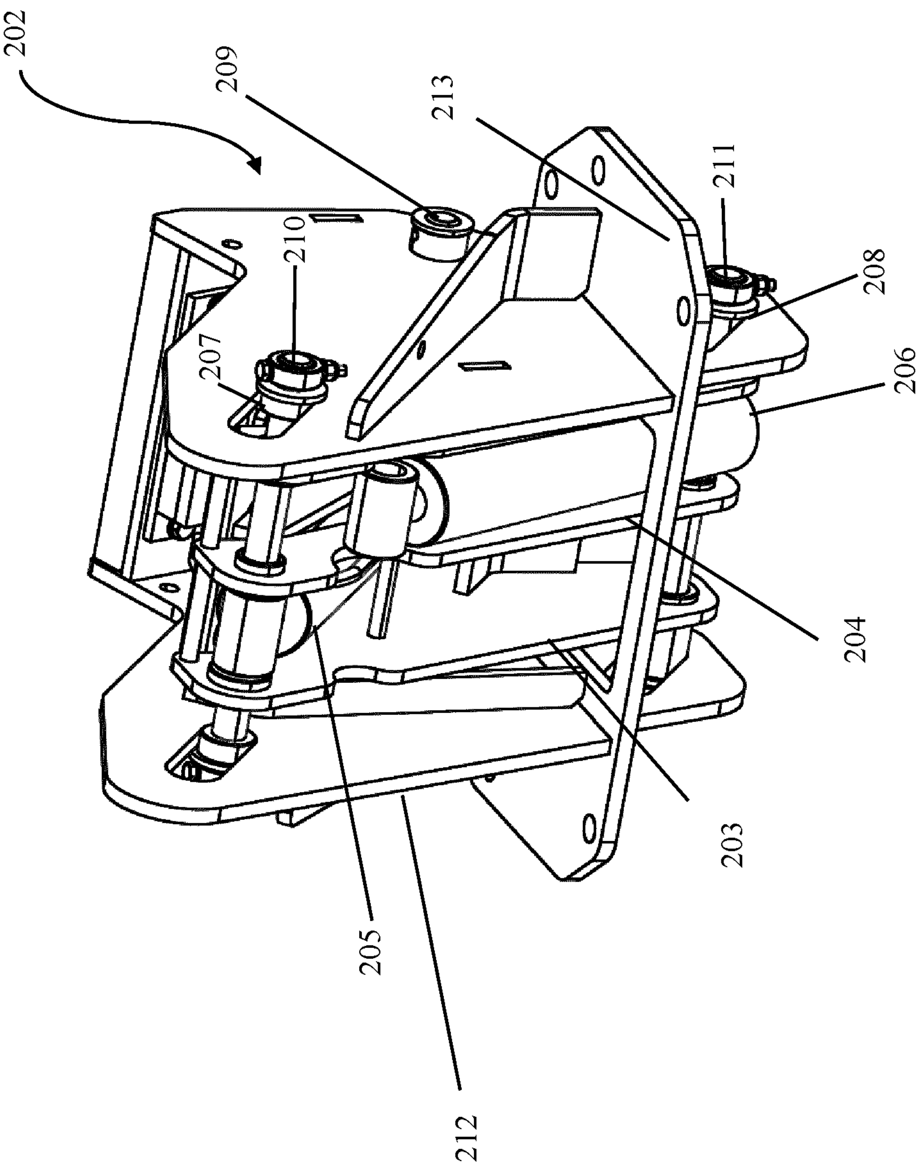
FIG. 3 is a perspective view of the support assembly according to one of the preferred embodiments of the present disclosure.

Referring to FIG. 3, the support assembly 202 comprises a frame 212, installed on a base 213, with a first bracket 203 for housing a slide actuator 205 and a second bracket 204 for housing a rotation actuator 206. The brackets 203, 204 and the rotation actuator 206 are mounted in such a way that they pass through the opening in the base 213. The support assembly 202 is coupled with the side wall 200, and the actuators 205, 206 are responsible for the movements of the side wall 200 between folded and unfolded states. The slide actuator 205 provides a first translational motion to the side wall 200 when the side wall 200 moves between the locked transport position A and an unlocked transport position B, and a second translational motion when the side wall 200 moves between the unlocked working position C and the locked working position D. The rotational actuator 206 provides pivoting of the side wall 200, causing it to rotate between folded and unfolded states, particularly between unlocked transport position B and unlocked working position C. According to a preferred embodiment, the slide actuator 205 and the rotational actuator 206 are hydraulic cylinders.

The support assembly 202 further comprises a pair of first guiding grooves 207 which are configured to receive first pivot pins 210, such guiding grooves 207 being parallel to each other and located in the walls of the frame 212. The pins 210 slide along the grooves 207, in response to actuation from slide actuator 205, thereby resulting in the translational motion of the side wall 200, particularly between the locked transport position A and an unlocked transport position B, and also between unlocked working position C and locked working position D.

The support assembly 202 further comprises a pair of second guiding grooves 208 located in the wall of the frame 212 below the base 213, such guiding grooves 208 being parallel to each other and configured to receive the second pivot pins 211. The first and second pivot pins 210, 211 are configured to move synchronously and parallelly in response to the translational actuation from the slide actuator 205.

Further, the pivot pin 210 also enables the rotation of the side wall 200 in response to the actuation from rotational actuator 206. Pivot pin 209 couples the slide actuator 205 to the main frame 212.

Referring to FIG. 3 along with FIGS. 5A-5D, the hydraulic cylinder of slide actuator 205 exerts pressure to move the pivot pins 210, 211 upwards in their guiding grooves 207, 208 enabling a translational actuation, thereby causing the folded side wall to move from locked transport position A to unlocked transport position B. This is the first translational movement by slide actuator 205. Thereafter, rotational actuator 206 exerts pressure on the pivot pin 210, enabling a rotational actuation, thereby causing the unfolding of the side wall 200 as it changes its position from unlocked transport position B to unlocked working position C. Then, hydraulic cylinder of the slide actuator 205 retracts causing the pivot pins 210, 211 to move downwards in the guiding grooves 207, 208 thereby moving the side wall 200 from unlocked working position C to locked working position D. This is the second translational movement caused by the slide actuator 205. As the side wall 200 slides down, it immobilizes itself with the help of locking assembly 300 as shown in FIG. 4.

Figure 4:
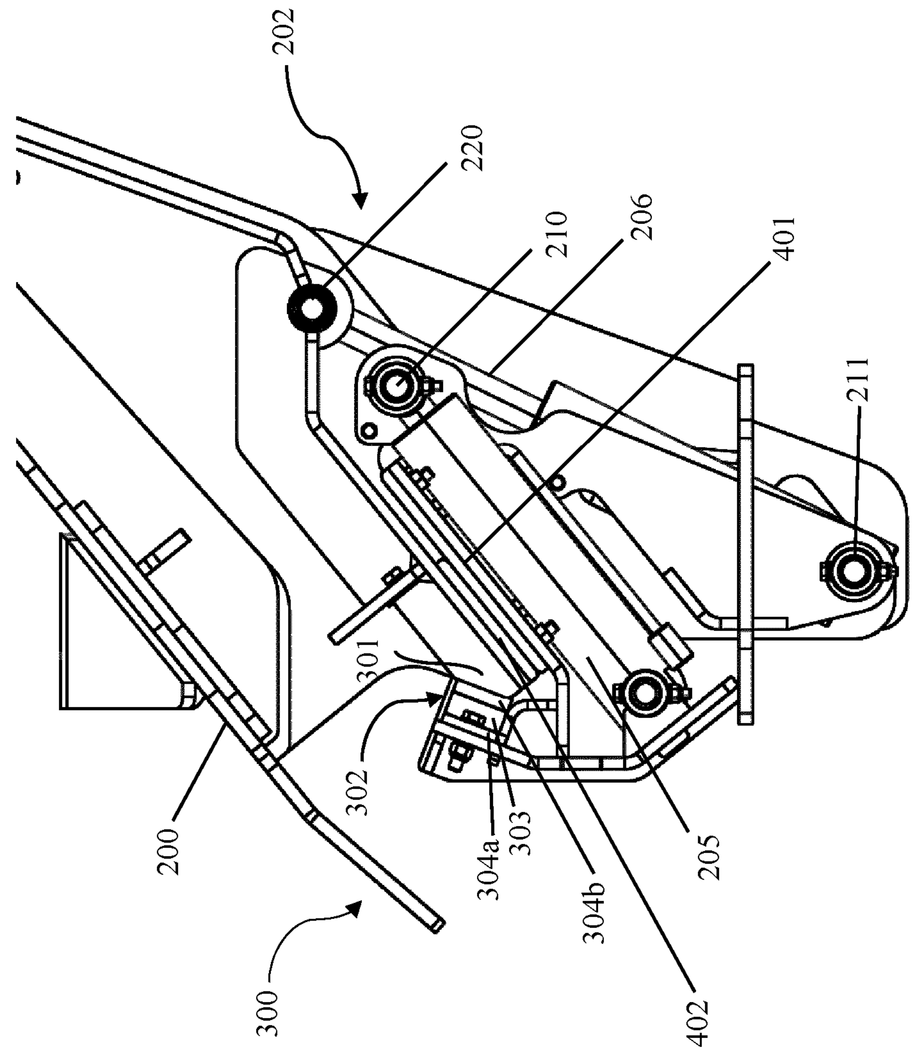
FIG. 4 is a cross-sectional view of the locking assembly according to one of the preferred embodiments of the present disclosure.

Referring to FIG. 4, locking assembly 300 comprises of first locking means 301 which is protruding from the lower surface of the side wall 200, second locking means 302 which is mounted on the support assembly 202, and the retaining members 403*a* and 403*b* (as shown in FIG. 2B). According to a preferred embodiment, the first locking means 301 is in the shape of a wedge, as shown in the FIG. 4. The wedge shape is favourable to engage with the second locking means 302. The first locking means 301 is provided with a lining, referred to as the second liner assembly 402, on its lower surface, which is preferably made of a material having a friction coefficient which is lower than the friction coefficient of the side wall 200. One preferred example of such a material is polyethylene.

The support assembly 202 also has a similar lining referred to as the first liner assembly 401 mounted on its upper surface. The first liner assembly 401 is also preferably made of a material having a friction coefficient which is lower than the friction coefficient of the side wall 200. The first and the second liner assemblies 401, 402 are preferably made of the same material, for facilitating the downward sliding movement of the first locking means 301 when it comes into physical contact with support assembly 202 to eventually engage with the second locking means 302.

As can be seen in FIGS. 4, 5A-5D, the side wall 200 is provided with a pivot 220 which is positioned axially above the first locking means 301.

The second locking means 302 mounted on the upper surface of the support assembly 202 further comprises of three elements, namely two metallic plates, a front metallic plate 304*a* and a rear metallic plate 304*b* and an elastic element 303 which is pressed between the metallic plates 304*a* and 304*b*. The front metallic plate 304*a* is in direct contact with the support assembly 202 and the rear metallic plate is configured to face the first locking means 301 when it slides down to engage with the second locking means 302 to lock the side wall 200 in unfolded working position D.

Figure 5B:
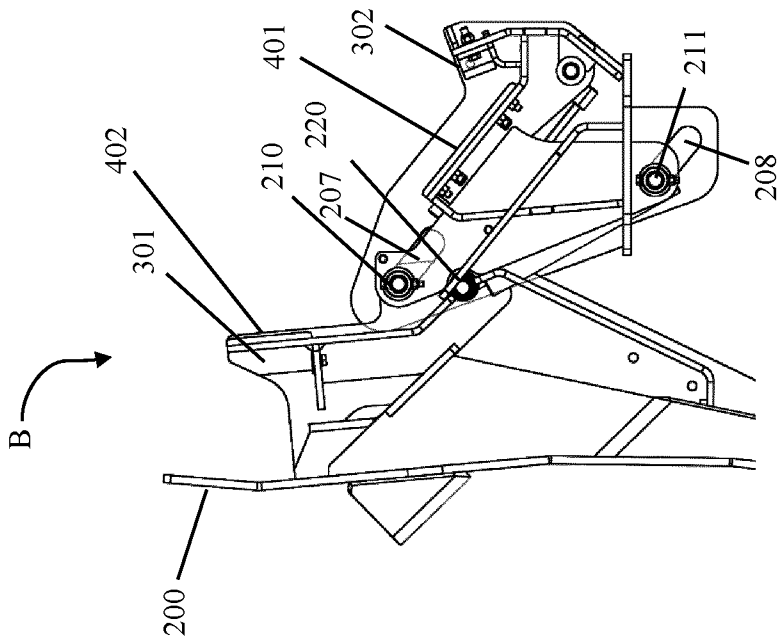
FIG. 5B is a cross-sectional view of the locking assembly when the side wall is in unlocked transport position B according to one of the aspects of the present disclosure.
Figure 5A:
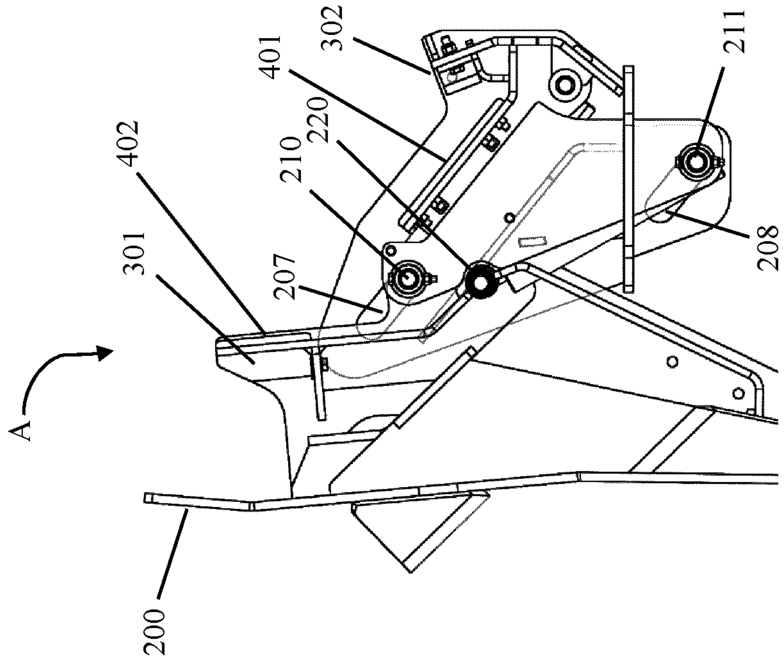
FIG. 5A is a cross-sectional view of the locking assembly when the side wall is in locked transport position A according to one of the aspects of the present disclosure.
Figure 5D:
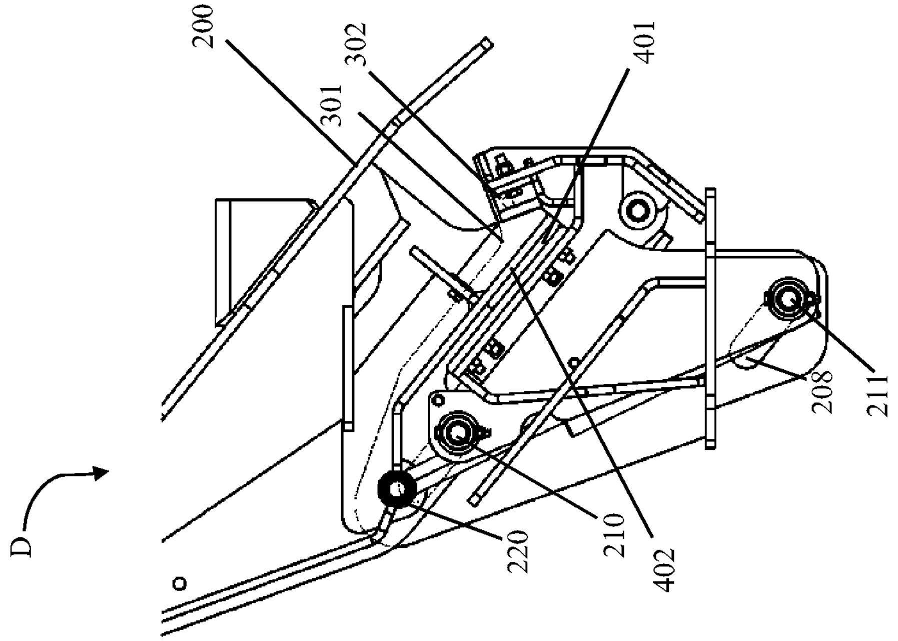
FIG. 5D is a cross-sectional view of the locking assembly when the side wall is in locked working position D according to one of the aspects of the present disclosure.
Figure 5C:
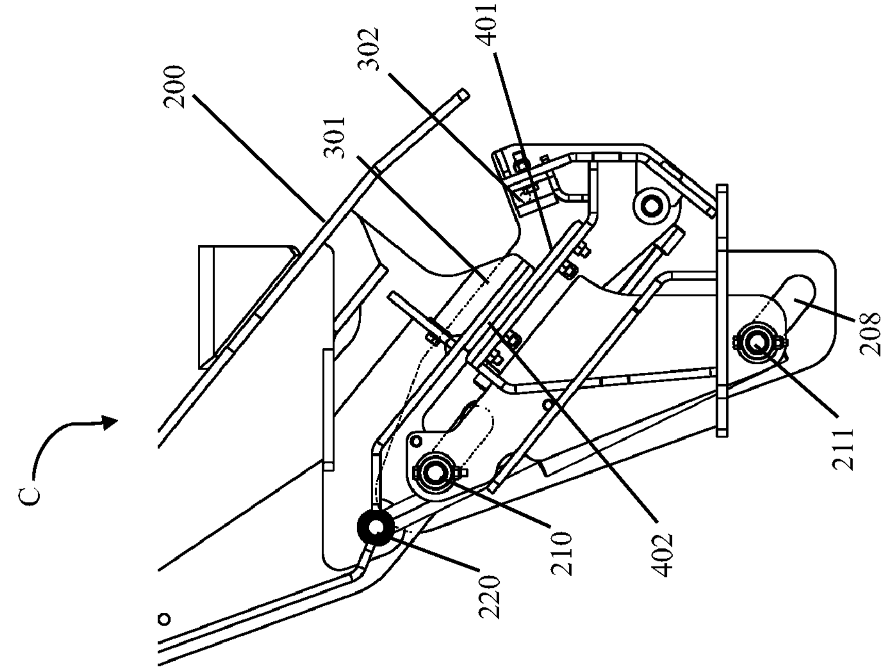
FIG. 5C is cross-sectional view of the locking assembly when the side wall is in unlocked working position C according to one of the aspects of the present disclosure.

The steps for locking the side wall 200 are shown in FIGS. 5A-5D. Referring to FIG. 5A, in the first step, the side wall 200 is in folded state or the locked transport position A. In this position, the fist locking means 301 is directed upwards. The pins 210, 211 are at the bottom of the guiding grooves 207, 208 respectively. Referring to FIG. 5B, in the second step, the side wall 200 acquires the unlocked transport position B, when the pins 210, 211 move upwards in their respective guiding grooves 207, 208. This movement, also referred to as the first translational movement, is a result of actuation provided by the slide actuator 205. Further, referring to Figure C, the third step is shown, where the side wall 200 is now in opened or unfolded state. This is a result of the rotational actuation provided by the rotational actuator 206, which causes the side wall 200 to pivot on the pin 210 and acquire the unlocked working position C. For the fourth and last step for locking the side wall 200, the FIG. 5D shows that the second translational movement takes place, with the pins 210, 211 sliding downwards in their respective guiding grooves 207, 208 from the unlocked working position C to the locked working position D. At this point, the first locking means 301 slides downwards while establishing physical contact between first liner assembly 401 and second liner assembly 402. Being made of low friction material, the liner assemblies 401 and 402 provide smooth sliding interaction between the first locking means 301 and the upper surface of the support assembly 202. Further, as it slides down, the first locking means 301 pushes the second locking means 302, and receives a back pressure owing to the presence of the elastic element 303 which forms a part of the second locking means 302. When the contrasting forces from first and second locking means 301, 302 get balanced, the side wall 200 achieves a state of immobilization in the locked working position D. In this way, the self-locking of the side wall 200 occurs.

Reverse order of the steps described above would cause unlocking and folding of the side walls 200.

The invention claimed is:

1. A folding feeder hopper for a bulk material processing apparatus comprising:

at least one side wall pivotably mounted to a support frame having a front end and a rear end, the side wall being mounted on the support frame via at least one pivot mount;

a rear wall mounted to the support frame at the rear end;

at least one support assembly of the side wall mounted on the support frame and including a first bracket housing a slide actuator and a second bracket housing a rotation actuator; and a locking assembly including a first locking means provided at a lower surface of the side wall and a second locking means mounted at the support assembly such that the first locking means is configured to engage with the second locking means to immobilize the side wall, wherein the second locking means comprises a material which has a higher degree of elasticity a material of the first locking means, wherein the rotation actuator is configured to provide pivoting of the side wall between an unlocked transport position and an unlocked working position.

2. The feeder hopper as claimed in claim 1, wherein the support assembly includes a first guiding groove configured to receive a first pivot pin and a second guiding groove configured to receive a second pivot pin, the first guiding groove being parallel to the second guiding groove, wherein the first and the second pivot pins are configured to move synchronously in response to a translational actuation from the slide actuator.

3. The feeder hopper as claimed in claim 1, wherein the second locking means comprises an elastic member positioned between a front metal plate and a rear metal plate.

4. The feeder hopper as claimed in claim 1, wherein the side wall is provided with a pivot positioned axially above the first locking means.

5. The feeder hopper as claimed in claim 1, wherein the slide actuator is configured to provide translational movement to the side wall between a locked transport position and the unlocked transport position.

6. The feeder hopper as claimed in claim 1, wherein the first locking means is configured to engage with the second locking means when the slide actuator moves the side wall from the unlocked working position to a locked working position enabling the side wall to be locked in the locked working position.

7. The feeder hopper as claimed in claim 1, wherein the support assembly includes a first liner assembly mounted on the upper surface of the support assembly.

8. The feeder hopper as claimed in claim 7, wherein the first locking means is provided with a second liner assembly mounted on the lower surface of the first locking means.

9. The feeder hopper as claimed in claim 8, wherein the first liner assembly is configured to make a sliding contact with the second liner assembly when the slide actuator causes the side wall to move translationally between the unlocked working position and a locked working position.

10. The feeder hopper as claimed in claim 9, wherein a line of action of the sliding contact between the first liner assembly and the second liner assembly is parallel to a line of action of the slide actuator when it provides translational movement to the side wall between the unlocked working position and the locked working position.

11. The feeder hopper as claimed in claim 1, wherein the first locking means is in the form of a wedge protruding from the lower surface of the side wall.

12. The feeder hopper as claimed in claim 8, wherein the first and the second liner assemblies are made of a material having a friction coefficient lower than a friction coefficient of the material of the wall.

13. The feeder hopper as claimed in claim 2, wherein the locking assembly includes at least one retaining member mounted on the front end of the support frame and at least one retaining member mounted on the rear wall.

14. The feeder hopper as claimed in claim 13, wherein an engagement plane of the at least one retaining members is parallel to the first and the second guiding grooves.

15. A method for locking at least one side wall of a feeder hopper of a bulk material processing apparatus, the method comprising the steps of:

providing the feeder hopper, the feeder hopper comprising:

at least one side wall pivotably mounted to a support frame having a front end and a rear end, the side wall being mounted on the support frame via at least one pivot mount;

a rear wall mounted to the support frame at the rear end;

at least one support assembly of the side wall mounted on the support frame and including a first bracket housing a slide actuator and a second bracket housing a rotation actuator; and a locking assembly including a first locking means provided at a lower surface of the side wall and a second locking means mounted at the support assembly such that the first locking means is configured to engage with the second locking means to immobilize the side wall, wherein the second locking means comprises a material which has a higher degree of elasticity a material of the first locking means, wherein the rotation actuator is configured to provide pivoting of the side wall between an unlocked transport position and an unlocked working position;

a first translational movement by the slide actuator enabling the side wall to move from a locked transport position to the unlocked transport position;

a rotational movement by the rotation actuator enabling the side wall to move from the unlocked transport position to an unlocked working position; and a second translational movement by the slide actuator enabling the side wall to move from the unlocked working position to a locked working position, wherein the locking assembly is configured to lock the side wall in the locked working position, wherein the locking assembly includes the first locking means provided at a lower portion of the side wall and the second locking means mounted at the support assembly, and wherein the first locking means mechanically engages with the second locking means when the slide actuator moves the side wall from the unlocked working position to the locked working position enabling the side wall to be locked in the locked working position.

16. A mobile bulk material processing apparatus comprising:

a support frame;

a processing unit supported at the support frame;

tracks or wheels arranged to allow the apparatus to move over the ground;

a discharge conveyor;

a primary motor output; and a folding feeder hopper arranged to contain material to be fed to the processing unit, the folding feeder hopper comprising:

at least one side wall pivotably mounted to a support frame having a front end and a rear end, the side wall being mounted on the support frame via at least one pivot mount;

a rear wall mounted to the support frame at the rear end;

at least one support assembly of the side wall mounted on the support frame and including a first bracket housing a slide actuator and a second bracket housing a rotation actuator; and a locking assembly including a first locking means provided at a lower surface of the side wall and a second locking means mounted at the support assembly such that the first locking means is configured to engage with the second locking means to immobilize the side wall, wherein the second locking means comprises a material which has a higher degree of elasticity a material of the first locking means, wherein the rotation actuator is configured to provide pivoting of the side wall between an unlocked transport position and an unlocked working position.

* * * * *